Figure 1:
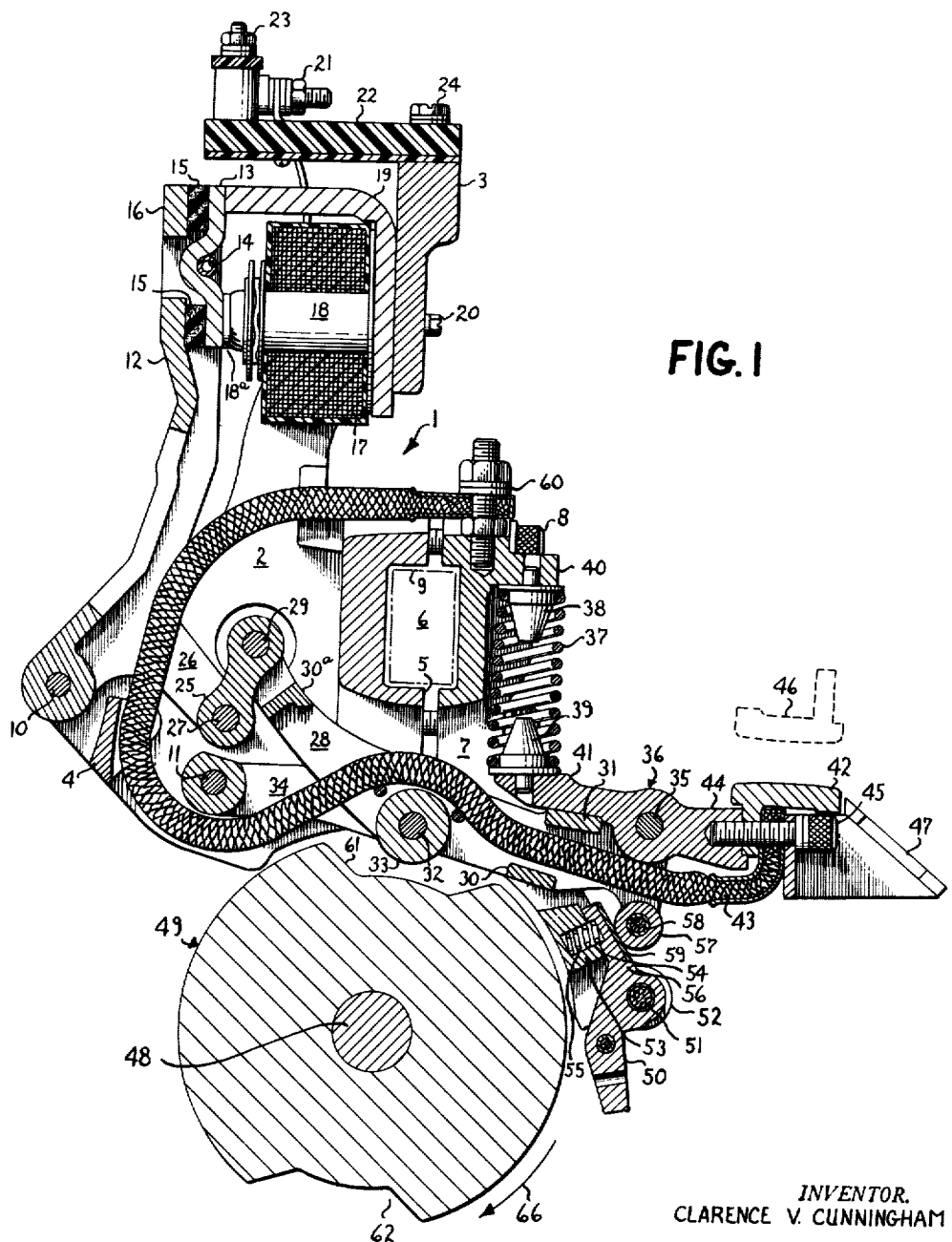

INVENTOR.
CLARENCE V. CUNNINGHAM

May 14, 1963 C. V. CUNNINGHAM 3,089,931
MOTOR OPERATED CAM CONTACT ASSEMBLY
Filed Oct. 20, 1961 3 Sheets-Sheet 3

INVENTOR.
CLARENCE V. CUNNINGHAM
BY Robert H Montgomery
ATTORNEY

United States Patent Office 3,089,931
Patented May 14, 1963

3,089,931
MOTOR OPERATED CAM CONTACT ASSEMBLY
Clarence V. Cunningham, Erie, Pa., assignor to General Electric Company, a corporation of New York
Filed Oct. 20, 1961, Ser. No. 146,599
6 Claims. (Cl. 200—92)

This invention relates to an electrical contact arrangement, and more particularly relates to a selectively actuated, cam-operated electrical contact.

In many electrical networks, electrical contacts are operated, that is, opened and closed, in a predetermined sequence to provide a predetermined sequencing of electric circuit connections. One example of such a network is found in electrically propelled traction equipment where traction motors through various transitions mays be connected in series, connected in series with shunted fields, connected in parallel, and then in parallel with shunted fields. Additionally, current-limiting resistors are used in circuit with the motors and then selectively shunted from the circuit as motor speed increases. A usual technique of accomplishing the necessary sequential switching in such an electrical network is by utilization of a motor-driven controller which comprises a shaft having a plurality of cam members thereon which are adapted to or cause to open, close and/or hold open or closed associated electric contacts in a predetermined sequence as the shaft is rotated. The cam shaft is driven by a motor which is energized or de-energized in response to some equipment characteristic such as motor current or speed.

In an arrangement of this type, the controller may have to be driven through many sequencing steps to provide necessary motor circuit connections, disconnections and/or reconnections. For this reason, efficient utilization of the available surfaces of the controller as it is rotated is a prime consideration.

Therefore, it is highly desirable to have switching or electric contact devices adapted to be actuated by the controller cam members in both directions (opened and closed) with minimum movement of the controller, or, in some cases, changed from one state to another with no rotation of the controller. Such arrangement would provide greater flexibility and utilization of the available periphery of the controller cam members. Moreover, in some emergency conditions it would be advantageous to be able to open a cam-operated switch without rotation of the cam.

Accordingly, it is an object of this invention to provide an improved cam-closed, spring-opened, magnetically-dumped electric contactor arrangement wherein an electric contact is initially actuated by a cam and may be de-actuated upon occurrence of an electrical condition without movement of the cam.

It is another object of this invention to provide such a contactor mechanism having a minimum of sliding or rubbing surfaces.

It is a further object of this invention to provide an improved cam-operated contact operating arrangement wherein a cam-operated contact is subservient to an electromagnetic condition in either state of operation.

Briefly stated, the invention in one form thereof comprises a movable contact mechanism comprising a magnetically-actuated latching arm which effectively provides a pivot point for a lever carrying an electric contact adapted to contact a stationary electric contact to complete an electric circuit. When the latching arm is magnetically actuated, it provides a fixed pivot point for the contact-carrying lever and the lever may be rotated by a cam or other means to close the electric circuit. When the latching arm is de-actuated, attempted rotation of the lever is converted into movement of the latching arm and insufficient movement of the lever occurs to close the electrical circuit. Also, the contact-carrying lever may be so biased that upon de-actuation of the latching arm the biasing means causes movement of the lever about its point of contact with the cam which is converted into movement of the latching arm, which results in opening of the electric circuit. The mechanism further comprises means for ensuring a wiping contact between the movable and stationary contact elements to ensure good electrical contact therebetween.

Figure 2:
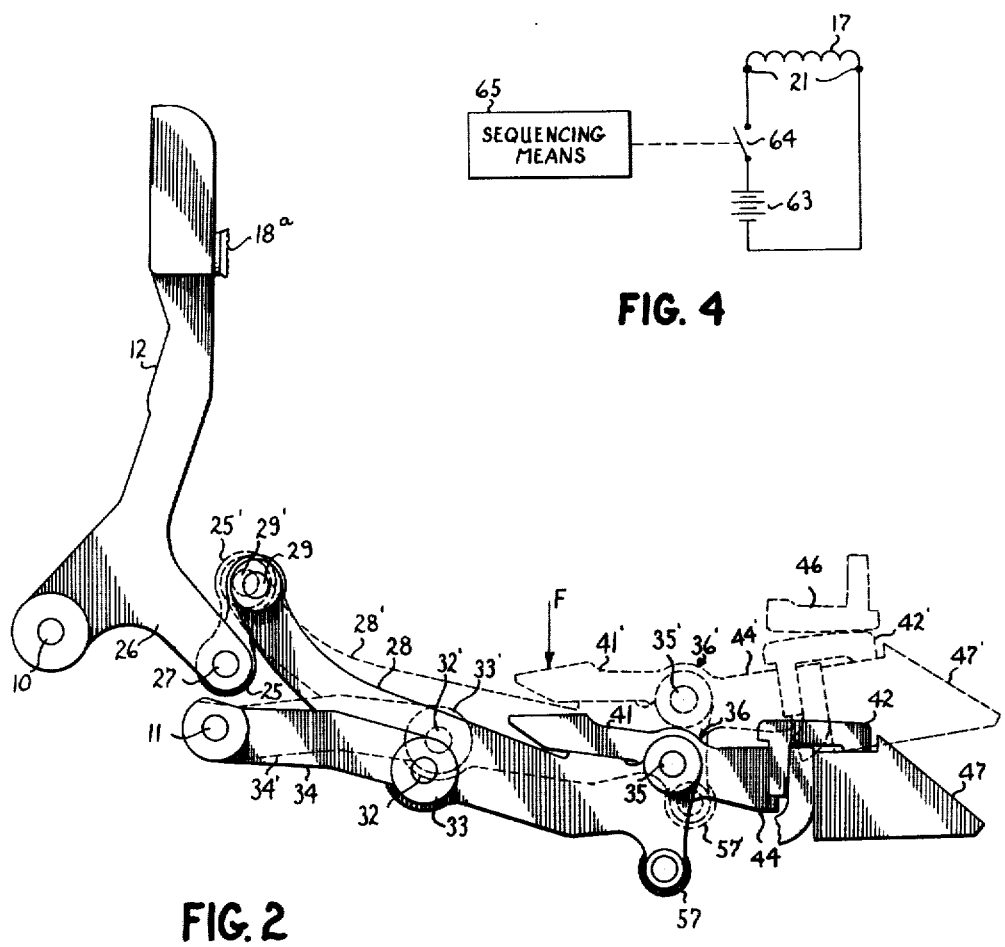
Figure 3:
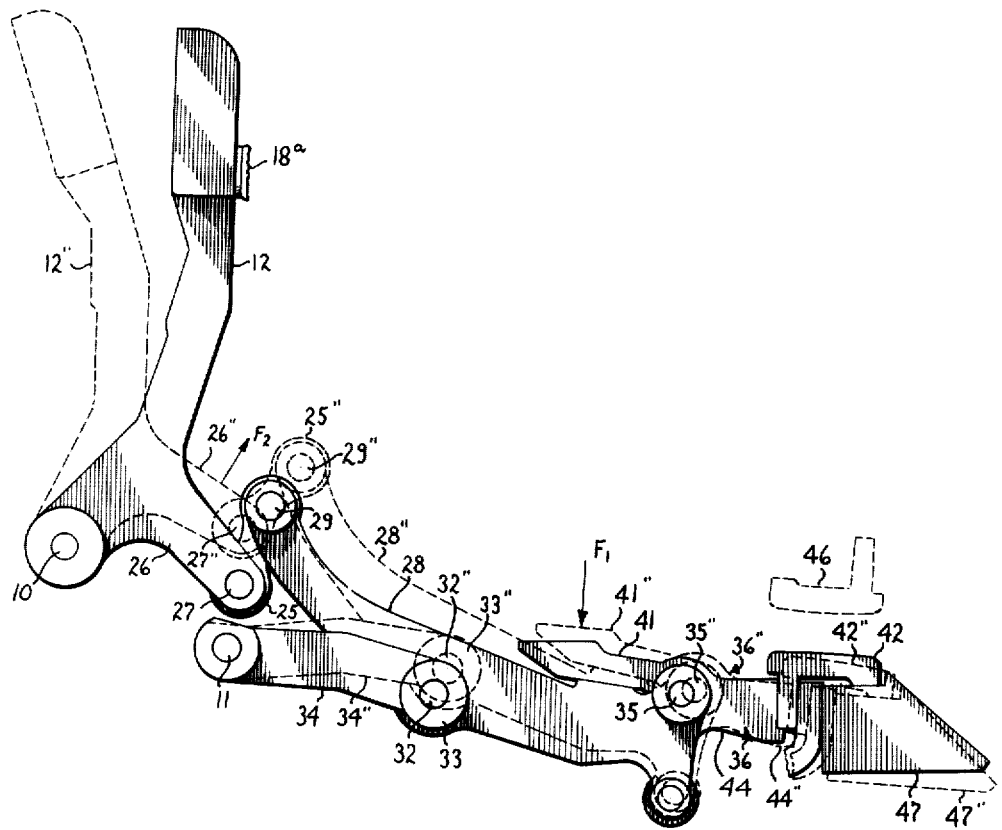

The features of the invention which are believed to be novel are pointed out with particularity in the claims appended to and forming part of this specification. However, the invention, together with further objects and advantages thereof, may be most easily understood by reference to the following description taken in conjunction with the following drawings wherein FIGURE 1 illustrates a contactor mechanism embodying the invention;

FIGURES 2 and 3 are illustrative of the operation of the contactor of FIGURE 1; and FIGURE 4, in schematic and block form, illustrates a coil-actuating arrangement.

Reference is now made to FIG. 1, which illustrates a contactor mechanism embodying the invention. FIG. 1 is a sectional view through the contactor. Throughout the description thereof various parts may be referred to in the plural, although only one of a pair is shown in the sectional view. The contactor mechanism of FIG. 1 comprises a frame member 1 having a pair of spaced vertical portions 2, joined by bridging portions 3, 4 and 5. Bridging portion 5 is shaped to define a channel 6 with member 7. Member 7 is adapted to be fastened to portion 5 by bolts 8 so that the frame member 1 may be secured to an insulated supporting bar, as indicated by the phantom lines 9.

Frame member 1 carries pivot pins 10 and 11 between vertical portions 2, which provide fixed pivot points. Pivotally mounted on pin 10 is a magnet latching arm 12 which carries a magnetic conductor or armature 13. Armature 13 is carried on latching arm 12 by means of pin 14. Pads of resilient material 15 are interposed between armature 13 and portion 16 of latching arm 12 to absorb shock due to closing of armature 16. Latching arm 12 is adapted to be locked in the position shown when coil 17 is energized. Coil 17 is wound on a core 18 of magnetic material having an extending portion 18a arranged to contact armature 13. Coils 17 and core 18 are mounted on magnetic conductor member 19 carried by bridging portion 3 by means of bolts 20. The coil 17, core 18 and magnetic conductor 19 comprise electromagnetic means adapted to latch armature 13 and therefore latching arm 12. Core 18, armature 13 and magnetic member 19 form a closed magnetic circuit which is energized when coil 17 is energized from a source of potential, not shown, through terminals 21 which are mounted on an insulating member 22 by means of bolts 23. Insulating member 22 is mounted on bridging portion 3 by means of bolts 24.

A link 25 is pivotally secured at one end thereof between spaced arms 26 on latching arm 12, which extend transversely therefrom, by means of a pin 27. The other end of link 25 is pivotally secured between spaced arm portions of a contact carrier arm 28 by means of pin 29. The spaced arms of contact carrier arm 28 are rigidly held together by bridging portions 30, 30a and 31.

Rotatably carried on pin 32 which is carried between the spaced arms of contact carrier arm 28 intermediate the ends thereof is a cam follower 33. Also pivotally secured to pin 32 is one end of spaced arms of carrier link 34, the other ends of which are pivotally carried by pin 11 which is carried between frame portions 2.

Pivotally carried between the spaced arms of the other end of contact carrier arm 28 on pin 35, which is carried by spaced arms of contact carrier arm 28, is contact rocker arm 36. A spring member 37 mounted on spring guides 38 and 39 is positioned between the underside of ledge 40 of member 7 and arm 41 of contact rocker arm 36. Spring 37 biases arm 41 in the position shown against bridging portion 31 of contact carrier arm 28, and therefore exerts a biasing force on contact carrier arm 28 tending to hold arm 28 in the position shown in FIG. 1.

A contact member 42 and a flexible conductor 43 are secured to arm 44 of contact rocker arm 36 by means of a bolt 45. A stationary contact member 46 adapted to be contacted by contact member 42 to close an electric circuit, not shown, is mounted a predetermined distance above contact member 42 by suitable mounting means, not shown. An arcing horn 47 may also be secured to arm 44 by bolt 45. It will be noted that contact member 42 could be mounted on carrier arm 28 or a rigid extension thereof. The purpose and function of rocker arm 36 is hereinafter explained.

The contactor mechanism is mounted in operative relationship to a camshaft 48 carrying a cam 49 arranged to engage cam follower 33 along a predetermined portion of its periphery. In one embodiment of the invention, the shaft 48 carries a plurality of cams which are operative upon rotation of the shaft 48 to sequentially operate associated switches to sequentially make electric circuit connections, as previously explained.

The contactor mechanism may also include an interlock switch-actuating lever 50 pivotally mounted on pin 51 between the ends of spaced arms 52 of member 7. A bridging portion 53 between arms 52 provides a well 54 for spring 55 which biases arm 56 of lever 50 outwardly, and also cushions the dropping of arm 28 on lever 50. Also lever 50 provides a stop for carrier arm 28. A roller 57 carried on pin 58 between the arms of carrier arm 28 reacts against the bias of spring 55 on roller plate 59. Flexible conductor 43 is electrically connected to terminal 60 which is adapted to receive a connection from a circuit, not shown.

The operation of the contactor is now described with additional reference to FIGS. 2 and 3.

FIG. 2 illustrates the linkage of the contactor in the position shown in FIG. 1 in full line and the linkage position in dashed line when latching arm 12 is magnetically latched to core 18 due to energization of coil 17, and cam shaft 48 is rotated such that its periphery engages and lifts cam follower 33. In FIG. 2 the linkage elements in full line bear the same identifying numerals as in FIG. 1, and the same linkage elements in dashed line bear the same identifying numerals primed.

When latching arm 12 is magnetically latched in the position shown, pivot pin 27 is held stationary by virtue of its being supported in arms 26 of latching arm 12. Then when cam follower 33 is lifted by cam 49, carrier link 34 commences to rotate counterclockwise about pin 11. Link 25 rotates counterclockwise on pivot pin 27, and carrier arm 28 rotates about pins 27 and 29, carrying therewith rocker arm 36, arm 41 of which is biased against bridging portion 31 by spring 37 which exerts a force thereon indicated by the arrow F in FIG. 2. As contact member 42 engages contact member 46, which occurs just before rotational movement of carrier arm 28 ceases, the stationary contact member 46 bearing on contact member 42 causes rocker arm 36 to pivot about pin 35 against the bias force F of spring 37. This causes contact member 42 to have some movement tangent to the contact surface of contact member 46, which provides a wiping action between the contact members 42 and 46 to insure good electrical contact therebetween.

It will be noted that when arm 12 is magnetically latched, link 25, carrier link 34 and contact carrier arm 28 form with the frame member a four-bar mechanism, the fixed pivot points being pins 27 and 11. In the operation just described in conjunction with FIG. 2, it will be seen that the contactor operates as a cam-closed switch, and it will be seen that if the cam should be rotated until cam follower 33 is allowed to fall, the contactor will operate as a spring-opened switch by virtue of the biasing force F of spring 37. Reference is now made to FIG. 3 wherein the linkage elements in full line bear the same identifying numerals as in FIGS. 1 and 2 and the same linkage elements in dashed line bear the same numerals double primed. The dashed lines of FIG. 3 illustrate the positons the linkage elements assume upon de-energization of coil 17 after the contact members 42 and 46 have been closed by cam 49 and coil 17 has been de-energized.

Assume now that it is desired to open the contact members 42 and 46 without movement of the cam shaft. This may be accomplished by de-energizing coil 17 so that arm 12 is no longer magnetically latched to core 18. The spring 37 exerting a downward force $F_1$ on arm 41 of rocker arm 36 will cause carrier arm 28 to rotate in a clockwise direction about pin 32 held in a lifted position by the cam which causes link 25 to exert a force $F_2$ on arms 26, which produces a counterclockwise moment on latching arm 12 about pin 10 and resulting upward movement of pin 27 and the pivot point provided thereby. Thus it may be seen that pin 27 no longer provides a fixed pivot point, but pin 32 held in a lifted position by the cam provides a fixed pivot point. The counterclockwise movement of latching arm 12 permits contact carrier arm 28 to move in a clockwise direction and to drop contact member 42 from electrical contact with contact member 46. The contact members 42 and 46 have now been opened without rotating the cam and the cam shaft.

The contactor illustrated may be described as cam-closed, magnetically-dropped, spring-opened. It will be apparent that by virtue of the fact that the contact members 42 and 46 may be opened without rotation of the cam shaft through the magnetic dumping feature, operating space of the cam shaft is conserved in that a specific position of the camshaft does not have to be reserved to open the contact members 42 and 46 after they have been closed by a cam thereon, and moreover, the contact member 42 may be magnetically dumped from a closed position should an emergency condition arise. Furthermore, it will be seen that a well or depression may be provided in the periphery of cam 49 to reset the contact after it has been magnetically dumped.

As an illustration of the added cam shaft flexibility obtainable through use of a contactor embodying the invention, assume that the mechanism is in the position shown in FIG. 1. The cam 49 has two wells or depressions 61 and 62 into which cam follower 33 may drop. In FIG. 4 is shown a diagram of a circuit suitable for selectively energizing coil 17. Terminals 21 of coil 17 are connected across a source of potential 63 by a contactor or switch 64. Switch 64 is adapted to be selectively opened or closed by a sequencing means 65 which may comprise an interlocking switch of another contact operated by cam shaft 48, electromagnetic means responsive to the opening or closing of another electric contact in an electrical network, or other suitable means for selectively opening or closing switch 64. In one application of the invention, closing of switch 64 is made responsive to the opening of a series contactor in a traction motor circuit to enable closing of the parallel contactors in a well known manner.

Assume that switch 64 is open and cam shaft 48 is rotated in the direction as shown by arrow 66, FIG. 1. As cam follower 33 is lifted by the periphery of cam 49, latching arm 12 is pivoted about pin 10 as shown by arm 12" in FIG. 3. It will be noted that energization of coil 17 by closing of switch 64, will not now close contact members 42 and 46 since armature 13 is too far removed from core 18 to be attracted thereto. When cam 49 has rotated until cam follower 33 drops into cam well 62, latching arm 12 closes on core extension 18a. Upon closing of switch 64 to energize coil 17, the contact mechanism is enabled to close contact members 42 and 46, and upon further rotation of cam 49, in either direction, contact members 42 and 46 will be closed when cam follower 33 is lifted by cam 49. In this state, contact member 42 may be magnetically dropped or dumped at any time by de-energization of coil 17 even though cam follower 33 is in its lifted position. Such dumping of contact member 42 may be made in response to a command from sequencing means 65 or some supervisory control, not shown, responsive to an emergency condition.

While preferred embodiments of the invention have been selected for purposes of disclosure, other embodiments and modifications of the disclosed invention may occur to those skilled in the art which do not depart from the spirit and scope of the invention. Accordingly, it is intended to cover all modifications of the invention and changes in the illustrated embodiment thereof which do not depart from the spirit and scope of the invention.

What is claimed as new and is desired to secure by Letters Patent of the United States is:

1. A contact arrangement comprising:
   (a) a frame member;
   (b) a latching arm having a magnet armature mounted thereon and being pivotally mounted on said frame to allow for rotative movement of said latching arm;
   (c) electromagnetic means disposed proximate said armature and being operative when energized to attract said armature and hold said latching arm in a fixed position to prevent rotative movement thereof about its pivoted mounting on said frame;
   (d) first and second contact members adapted for relative movement into and out of engagement;
   (e) a lever arm having said first contact member mounted on one end thereof and being pivotally mounted at the other end to said latching arm;
   (f) a cam follower mounted intermediate the ends of said lever arm;
   (g) a cam shaft having a cam thereon operatively associated with said cam follower imparting motion to said lever arm upon rotation of said cam shaft, the pivotal mounting of said lever arm on said latching arm being arranged so that the motion imparted to said lever arm by rotation of said cam shaft is sufficient to cause selective engagement and disengagement of said contact members when said electromagnetic means is energized to prevent rotative movement of said latching arm and insufficient to cause such selective engagement and disengagement when said electromagnetic means is unenergized and rotative movement of said latching arm is permitted.

2. A contact arrangement comprising:
   (a) a frame member;
   (b) a latching arm having a magnet armature mounted thereon and being pivotally mounted on said frame member to allow for rotative motion;
   (c) a lever arm;
   (d) a link pivotally connecting one end of said lever arm to said latching arm to provide a pivotal mounting for said lever arm to said latching arm;
   (e) a pair of contact members, one of said members being stationary and the other mounted on the other end of said lever arm;
   (f) a cam follower mounted intermediate the ends of said lever arm;
   (g) a shaft having a cam thereon operatively associated with said cam follower and arranged to impart motion to said lever arm upon rotation of said shaft;
   (h) electromagnetic means disposed proximate said armature and being operative when energized to attract said armature and hold said latching arm in a fixed position so that rotative movement thereof about its pivoted mounting on said frame is prevented, the pivotal mounting of said lever arm to said latching arm providing that the motion imparted to said lever arm by rotation of said cam is sufficient to cause selective engagement and disengagement of said pair of contact members when said electromagnetic means is energized and rotative movement of said latching arm is prevented and insufficient to cause such selective engagement and disengagement when said electromagnetic means is unenergized so that said contact members may be selectively cam engaged and cam disengaged as well as disengaged by de-energization of said electromagnetic means.

3. In combination with a cam shaft adapted to sequentially cause actuation of a plurality of electric contacts upon rotation thereof, a contactor mechanism comprising:
   (a) a frame member;
   (b) a latching arm carrying a magnetic armature thereon and being pivotally mounted on said frame member;
   (c) electromagnetic means adapted when energized to attract said armature and hold said latching arm in a fixed position;
   (d) a lever arm having one end thereof pivotally mounted on said latching arm, a contact lever pivoted intermediate the end thereof on the other end of said lever arm, resilient means biasing one arm of said contact lever against said lever arm, the other arm of said contact lever having a contact member thereon adapted to be moved into electrical contact with a stationary contact member, said lever arm having a cam follower intermediate the ends thereof arranged to be engaged by a cam on said cam shaft to move said moveable contact member into electrical contact with said stationary contact member;
   (e) a cam on said cam shaft arranged to selectively engage and disengage said cam follower upon rotation of said cam shaft;
   (f) said pivotal mounting of said lever arm on said latching arm being arranged to cause rotative movement of said latching arm about its pivoted mounting on said frame upon engagement of said cam follower by said cam when said electromagnetic means is not energized and move said pivotal connection of said lever arm to said latching arm in a direction such that movement of said lever arm upon engagement of said cam follower by said cam is insufficient to close said contact member;
   (g) said stationary contact member being so positioned from said moveable contact member that contact therebetween is made prior to completion of motion of said lever arm caused by said cam whereby contact between said contact members causes said contact lever arm to rotate about its pivoted connection against the bias of said resilient means and produce a wiping action between said contact members.

4. A contact mechanism comprising:
   (a) a frame member;
   (b) a latching arm carrying a magnetic armature thereon and being pivotally mounted on said frame member;
   (c) electromagnetic means adapted when energized to attract said armature and hold said latching arm in a fixed position;
   (d) a lever arm having one end thereof pivotally mounted on said latching arm and the other end thereof carrying a moveable contact member adapted to be moved into electrical contact with a stationary contact member, said lever arm having follower means intermediate the ends thereof arranged to be engaged by a cam to move said moveable contact member into electrical contact with said stationary contact member;
   (e) a cam shaft having a cam thereon arranged to selectively engage and disengage said follower upon rotation of said cam shaft;

(f) said pivotal mounting of said lever arm on said latching arm being arranged to cause rotative movement of said latching arm about its pivoted mounting on said frame upon engagement of said cam follower by said cam when said electromagnetic means is not energized and move said pivotal connection of said lever arm to said latching arm in a direction such that movement of said lever arm upon engagement of said cam follower by said cam is insufficient to close said contact members, and (g) resilient means exerting a force on said lever arm in a direction to move said moveable contact member from said stationary contact member.

5. A contact mechanism comprising:

(a) a frame member;

(b) a latching arm carrying a magnetic armature thereon and being pivotally mounted on said frame member;

(c) electromagnetic means adapted when energized to attract said armature and hold said latching arm in a fixed position;

(d) a lever arm having one end thereof pivotally mounted on said latching arm and the other end thereof carrying a contact lever pivoted intermediate the ends thereof on the other end of said lever arm, resilient means biasing one arm of said contact lever against said lever arm, the other arm of said contact lever having a moveable contact member thereon adapted to be moved into electrical contact with a stationary contact member, said lever arm having a cam bearing follower intermediate the ends thereof arranged to be engaged by a cam to move said moveable contact member into electrical contact with said stationary contact member;

(e) a cam shaft having a cam thereon arranged to selectively engage and disengage said cam follower upon rotation of said cam shaft;

(f) said pivotal mounting of said lever arm on said latching arm being arranged to cause rotative movement of said latching arm about its pivoted mounting on said frame upon engagement of said cam follower by said cam when said electromagnetic means is not energized and move said pivotal connection of said lever arm to said latching arm in a direction such that movement of said lever arm upon engagement of said cam follower by said cam is insufficient to close said contact members;

(g) said stationary contact member being so positioned from said moveable contact member that contact therebetween is made prior to completion of motion of said lever arm caused by said cam whereby contact between said contact members causes said contact lever arm to rotate about its pivoted connection against the bias of said resilient means and produce a wiping action between said stationary contact members.

6. An electrical contact arrangement comprising:

(a) a frame member;

(b) a lever arm having a moveable contact member on one end thereof adapted to contact a stationary contact member, a cam follower member intermediate the ends thereof and a pivotal connection to a latching arm at the other end thereof;

(c) said latching arm carrying an electromagnetic armature thereon and being pivotally connected to said frame member;

(d) electromagnetic means for attracting said armature to hold said latching arm in a fixed position and thereby provide a fixed location pivotal connection between said latching arm and said lever arm;

(e) resilient means exerting a force on said lever arm in a direction to move said moveable contact member away from said stationary contact;

(f) a cam operatively positioned to engage and disengage said cam follower member upon rotation thereof;

(g) circuit means for energizing said electromagnetic means so that engagement of said cam follower member by said cam moves said contact members into electrical contact;

(h) said resilient means being effective to open said contact members upon disengagement of said cam from said cam follower member, said resilient means being further effective when said cam is engaging said cam follower member and said circuit means de-energizes said electromagnetic means to force said lever arm to rotate about said cam follower to open said contacts.

References Cited in the file of this patent
UNITED STATES PATENTS

| | | |
|---|---|---|
| 1,696,582 | Rankin | Dec. 25, 1928 |
| 1,740,405 | Kearsley | Dec. 17, 1929 |
| 2,181,283 | Palmer | Nov. 28, 1939 |
| 2,506,270 | Kidd | May 2, 1950 |
| 2,793,541 | Borcherot | May 28, 1957 |
| 2,962,908 | Landau et al. | Dec. 6, 1960 |

UNITED STATES PATENT OFFICE
CERTIFICATE OF CORRECTION

Patent No. 3,089,931                               May 14, 1963

Clarence V. Cunningham

It is hereby certified that error appears in the above numbered patent requiring correction and that the said Letters Patent should read as corrected below.

Column 7, line 33, after "cam" strike out -- bearing --.

Signed and sealed this 19th day of November 1963.

(SEAL)
Attest:
ERNEST W. SWIDER

Attesting Officer

EDWIN L. REYNOLDS

Acting Commissioner of Patents